Figure 2:
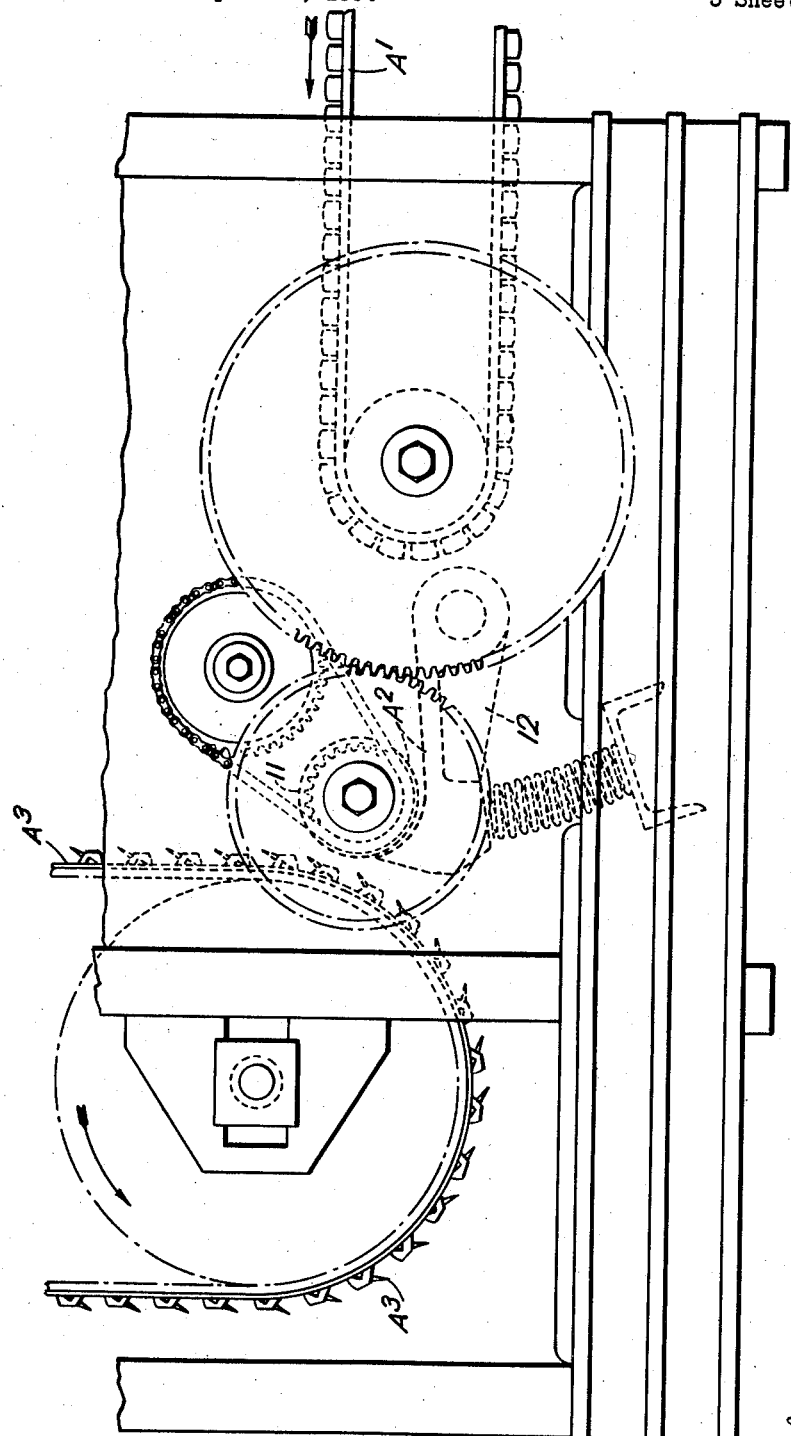

July 15, 1958 W. A. HUNTER ET AL 2,842,804
PREPARATION OF BLENDED FIBROUS MATERIALS
Original Filed April 15, 1954 5 Sheets-Sheet 1
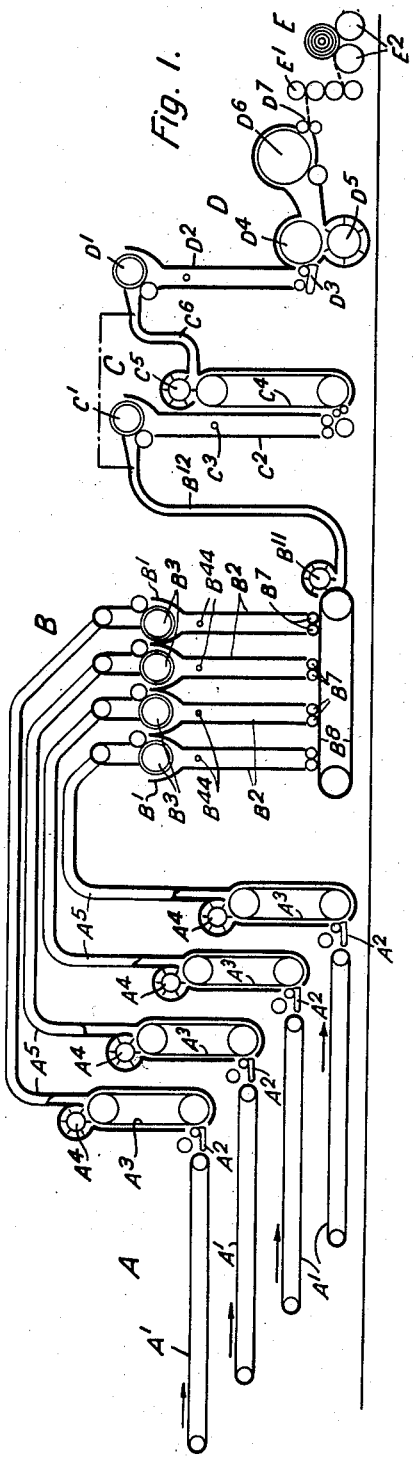
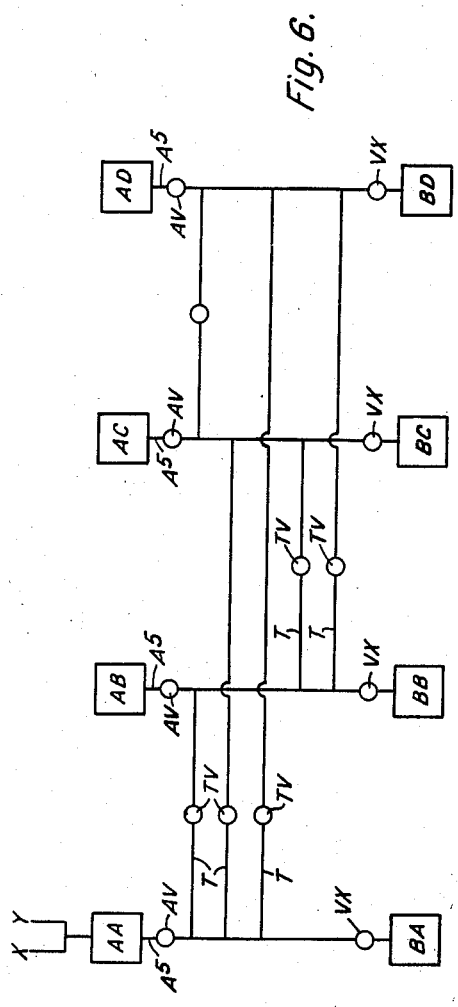

July 15, 1958 W. A. HUNTER ET AL 2,842,804
PREPARATION OF BLENDED FIBROUS MATERIALS
Original Filed April 15, 1954 5 Sheets-Sheet 2

Inventors
William Aldred Hunter and Frank Singleton
By Moss, Nolte, Crew + Berry
Attorneys July 15, 1958 W. A. HUNTER ET AL 2,842,804
PREPARATION OF BLENDED FIBROUS MATERIALS
Original Filed April 15, 1954 5 Sheets-Sheet 5

United States Patent Office 2,842,804
Patented July 15, 1958

2,842,804

PREPARATION OF BLENDED FIBROUS MATERIALS

William Aldred Hunter and Frank Singleton, Accrington, England, assignors to T. M. M. (Research) Limited, Oldham, England Original application April 15, 1954, Serial No. 423,388. Divided and this application June 27, 1955, Serial No. 518,302

11 Claims. (Cl. 19—146)

Our invention relates to a method of producing blended fibrous materials, this application being a division of our application Serial No. 423,388, filed April 15, 1954, entitled "Preparation of Fibrous Materials." The objects of the invention, generally speaking, are the provision of improved methods of preparing for processing, e. g., spinning, a blended mixture of two or more different fibrous materials (which term is employed herein to denote fibres of different kinds, grades, qualities, colours or other characteristics), such processes being suitable for continuous operation upon ingredients taken directly from the bale.

Our present invention covers methods which are improvements upon those disclosed in our application Serial No. 302,914 filed August 6, 1952, now U. S. Patent 2,816,327, for "Improvements relating to the Blending of Textile Fibrous Materials." The said application covers an apparatus and process in which different fibrous ingredients are blended with a high degree of intimacy of admixture, this involving the feeding of a plurality of ingredient materials to separate reception and delivery units; the material in each unit is fed therefrom upon a conveyor which receives the material from each unit in turn in finely divided form, so that the different ingredient materials are superposed one upon another. This material is stripped from the conveyor and may be subjected to further operations.

Our said application Serial No. 423,388 describes apparatus and process of the character just referred to in which various improvements thereupon are provided. Particularly, a plurality of opening devices are provided, which may be equal in number to the different ingredients which will be blended in the most common practice. The various ingredients may and commonly will be opened separately thereby and will then be conveyed to the appropriate reception and delivery units. These units will commonly be equal in number to the opening devices, and, if desired the different ingredient materials, separately opened, will be conveyed to different units, one ingredient material to each unit.

Such an arrangement will be adequate for the great majority of cases which arise in practice; a different distribution of the ingredient materials may however occasionally be called for. For example, with a plant having four openers and four reception units, it may be desired to change from a four colour or other ingredient blend, to one of two colours or other ingredients, so that only two of the four openers may be required. In such a case, according to the present invention, provision is made for distributing the output of the two openers as desired, for example, one ingredient to go to the first and third reception units and the other ingredient to the second and fourth, which would be likely to give a better blend than would be obtained by cutting two reception units out of operation when two openers were cut out, so that each opener would feed only one unit. Other variations of the method of distribution of the opened material than that just referred to may be desirable in different cases so that, for example, two or more openers will feed a single reception unit, or the like; and it may sometimes be desirable to arrange that one opener is to open more than one ingredient, as when, with a plant having four openers and four reception units, it is desired to change from a four material blend to one of five or more materials. Accordingly, provision is made in the present invention for the conveyance of opened material from selected members of the plurality of opening devices to selected members of the same or a greater number of reception and delivery units, as desired.

In accordance with one embodiment of apparatus comprised in the invention of our said application Serial No. 423,388, means are provided for subjecting each ingredient of the blend separately to an opening operation; for conveying each such opened ingredient separately to one of the reception and discharge units referred to, specifically, a gravity feed trunk, reserved for said ingredient, in quantities or at a rate such as to maintain a constant head of material therein; for discharging the ingredient from each trunk at a metered rate to a continuously travelling conveyor common to all said trunks, the material being transferred to the conveyor under conditions in which the conveyor receives successively a substantially uniform dispersion of tufts of each ingredient; and removing the resultant blend of ingredients from said conveyor.

The opened mass of blended fibres stripped from the conveyor is preferably formed into a lap suitable for treatment in the carding engine. The invention includes the optional interpolation of one or more supplementary opening stages after the material leaves the conveyor, in which case the material is preferably transported from the conveyor to said additional opening stage or stages at a rate proportional to the rate of throughput thereat.

A method employing apparatus of the character referred to is particularly adapted to the preparation of blends of synthetic fibres which are already clean and in a fair state of openness and freedom from closely matted bodies, and in dealing with such material a single opening operation before blending is usually sufficient. When, however, the same process is used for the treatment of cotton and other natural fibres in the baled condition in which they are commonly received at the mill, one or more supplementary opening and cleaning stages may be desirable.

The method embodied in our present application comprises, briefly stated, improvements upon the method described in our said application Serial No. 302,914, now U. S. Patent 2,816,327, relating to the opening operations in combination and in sequence with the other described operations for blending the material, etc. and also to improvements in the method of distribution of the opened material to different blending stations, as required by conditions in different cases.

A plant in which the method herein claimed may be practiced is illustrated diagrammatically in the accompanying drawing and is hereinafter described in greater detail with reference thereto. In said drawings Fig. 1 is a longitudinal elevation of the plant and Figs. 2, 3, 4 and 5 are partly sectional elevations drawn to an enlarged scale respectively illustrating the preliminary opening apparatus, the blending apparatus, the secondary opening apparatus and the final intensive opening apparatus, which are incorporated in the plant illustrated in Fig. 1. Fig. 6 is a diagram illustrating the several alternative methods of operating the apparatus according to the particular blend required.

The plant shown in Fig. 1 includes a preliminary opening apparatus A, the blending apparatus B, a secondary opening apparatus C, a final intensive opening apparatus D, and a lap-forming unit E.

The opening operation which constitutes the introductory stage of the process is preferably performed in respect of each individual ingredient of the blend upon the machine A (Fig. 2) comprising a travelling horizontal feed lattice $A^1$ upon which the fibrous material is deposited in the form of a layer of substantially even thickness, a roller-and-pedal feed mechanism $A^2$ which is adapted to receive the fleece from said lattice $A^1$ and to present it at a controlled rate in a slightly compacted condition to the teeth of a spiked lattice $A^3$ by which the fibres are subjected to a combing operation (Fig. 2) whilst held between said roller and pedals at $A^2$ and conveyed forward as released therefrom. The roller-and-pedal mechanism referred to is of course a well known device comprising the pedal 12, spring-pressed towards the roller 11, and against the fleece which passes between the roller and pedal.

The spiked lattice $A^3$ is cleared at its delivery point by a suitable pneumatic or other conventional stripping apparatus $A^4$, and the fibrous material, now thoroughly opened by the aforesaid combing operation, is transported by a pneumatic delivery duct $A^5$ to the blending station.

It will be understood that the machine designated generally by the reference letter A, and incorporating the components $A^1$ to $A^5$, is multiplied in parallel (as shown in Fig. 1) according to the number of different ingredients which it is proposed to include in a given blend. It is desirable that the opening action performed at A upon each ingredient shall be regulated, by adjusting the relative speeds of the roller and pedal feed mechanism $A^2$ and the spiked lattice $A^3$, in such manner that all the ingredients are presented at the next stage of the process in substantially the same degree of openness.

Figure 3:
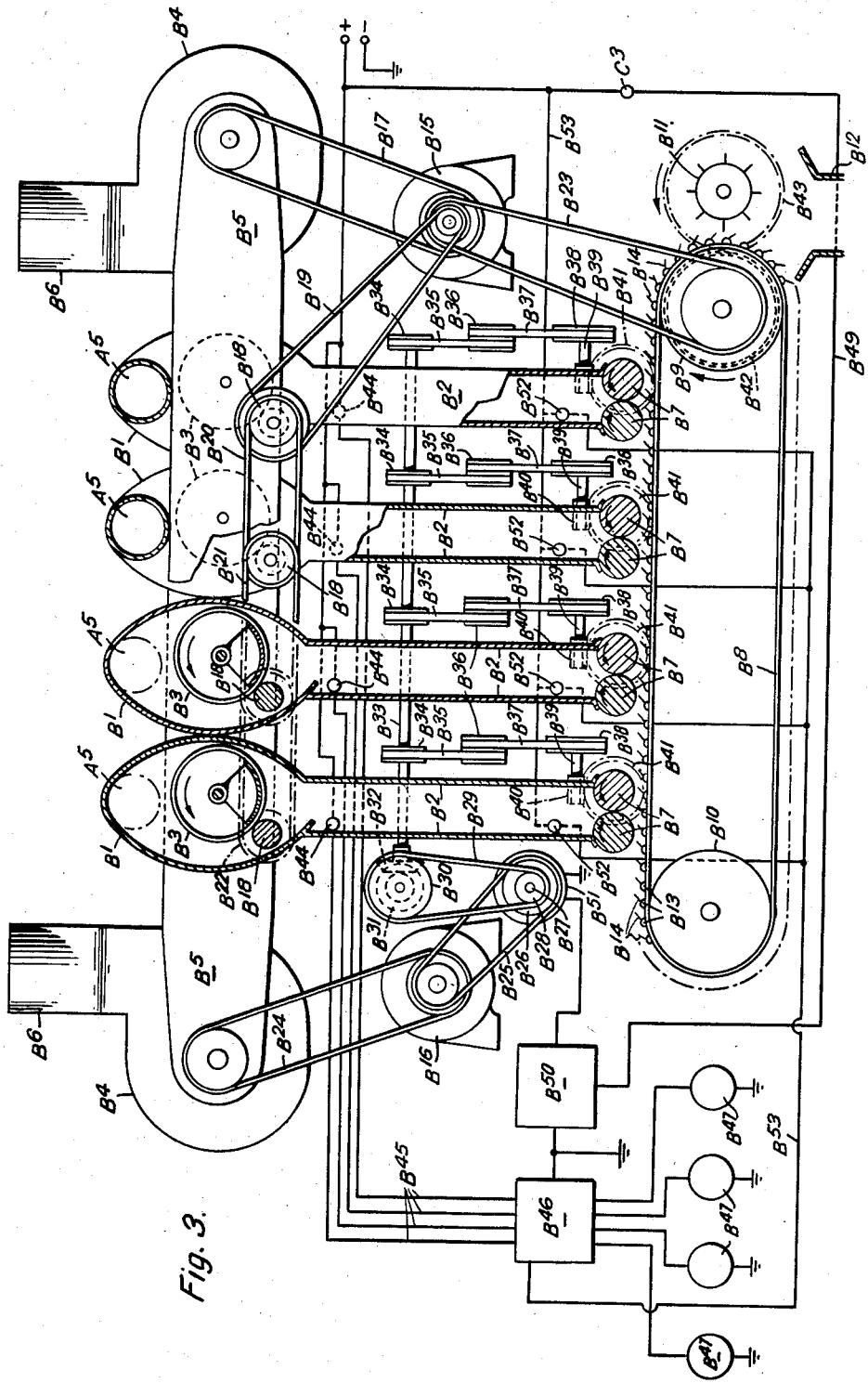
Figure 4:
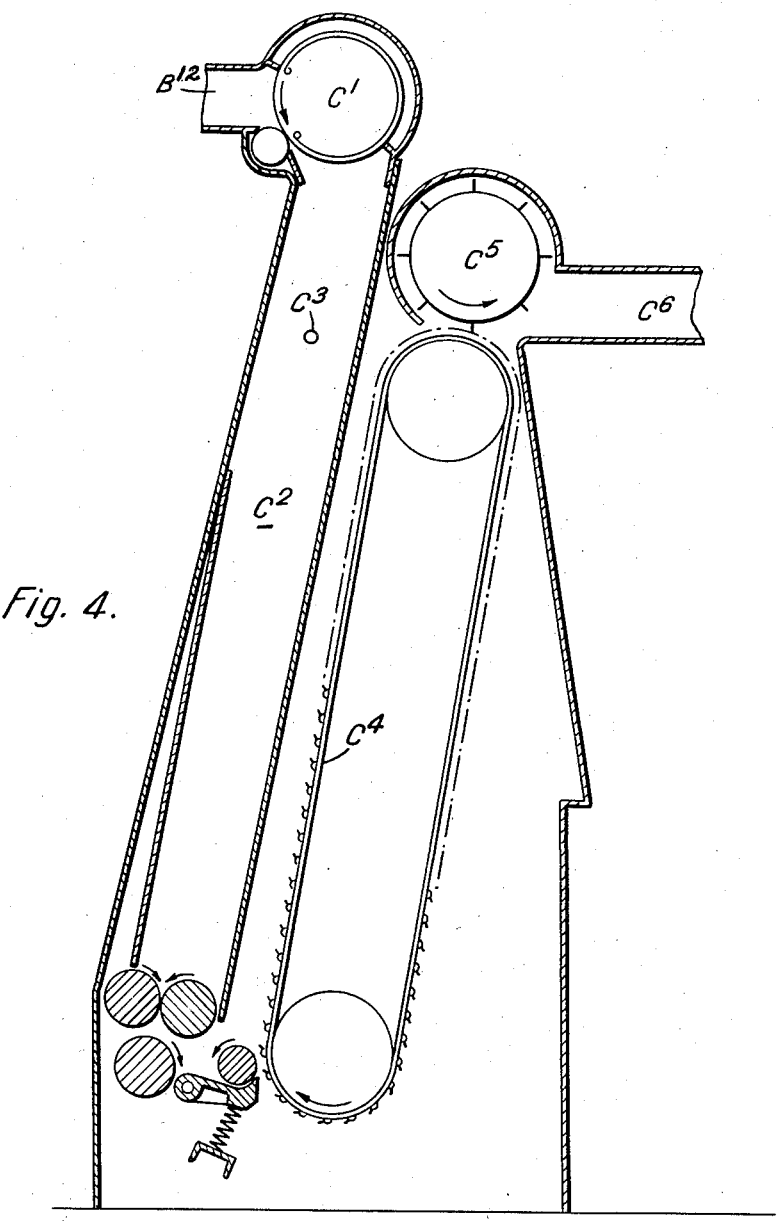
Figure 5:
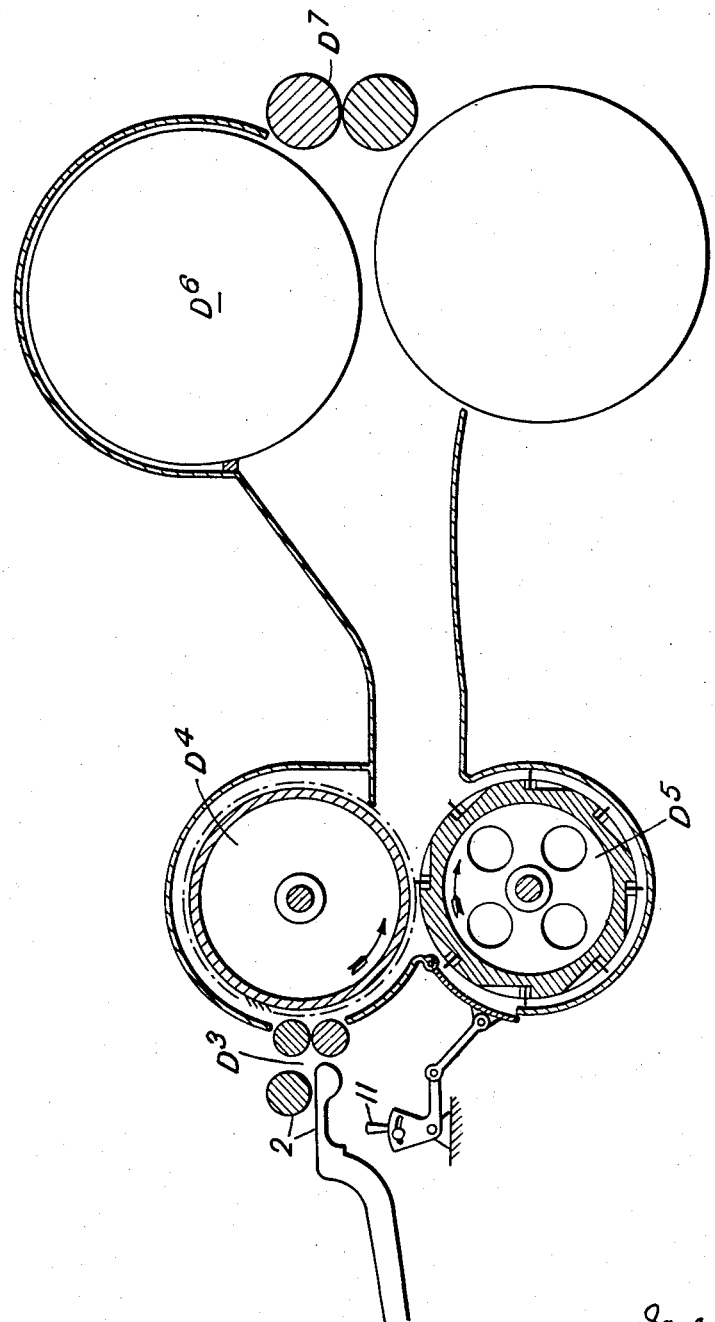

The blending apparatus includes an individual reception unit in respect of each of the parallel deliveries of different ingredients, and it may advantageously take the form of the apparatus shown in Fig. 3, which comprises an assembly of measured-rate delivery units each of which includes a vertical gravity-feed trunk $B^2$ at the head of which is a rotary damped condenser cage $B^3$. Said cage $B^3$ is enclosed in a casing $B^1$ which is entered by one of the pneumatic feed ducts $A^5$ at the delivery end thereof, and all the cages $B^3$ are aspirated by means of fans $B^4$, $B^4$ to which connection is made with said cages by manifolds $B^5$, $B^5$, and the outlets of which are seen at $B^6$, $B^6$.

The otherwise open aperture at the base of each gravity feed trunk $B^2$ is controlled by a pair of metering rollers $B^7$, $B^7$, which are arranged to rotate in contrary directions so as to discharge the contents of the trunk at a rate governed by the speed of rotation of the rollers.

The several trunks $B^2$ are assembled with their respective discharge points side-by-side in alignment, so that their respective metering rollers $B^7$ are contained in a common horizontal plane and located at equally spaced intervals, above the upper horizontal course of a high-speed lattice conveyor $B^8$, which is trained over driving rollers $B^9$, $B^{10}$, and with which there is associated a stripper element $B^{11}$, by which material conveyed on the lattice is removed and directed into the pneumatic trunk $B^{12}$ hereinafter referred to. Said lattice $B^8$ bears closely-spaced cross-members $B^{13}$ which are furnished with rows of spikes $B^{14}$ inclined in the direction of travel of the lattice. Said spikes $B^{14}$ may be disposed over the lattice surface in a uniformly staggered formation so as to avoid an unduly marked tracking effect. Furthermore, said spikes are set with their tips so close to the metering rollers $B^7$ that by the impalement by the former of the fringe of material which projects between said rollers (as will be understood from the following description), said spikes are individually charged with tufts of fibres collected in turn from the fringe at the metered discharge point of each trunk $B^2$.

The several moving parts of the apparatus are driven from two electric motors $B^{15}$, $B^{16}$. The shaft of the motor $B^{15}$ is geared to one of the fans $B^4$ by the belt $B^{17}$, to the condenser cage driving rollers $B^{18}$, $B^{18}$ by the belts $B^{19}$, $B^{20}$, $B^{21}$ and $B^{22}$, and to the roller $B^9$ of the conveyor lattice $B^8$ by the belt $B^{23}$. The shaft of the motor $B^{16}$ drives the other of the fans $B^4$ by the belt $B^{24}$ and to one of each of the pairs of metering rollers $B^7$, $B^7$ through the belt $B^{25}$, a pulley $B^{26}$, a shaft $B^{27}$, a pulley $B^{28}$, a belt $B^{29}$, a pulley $B^{30}$, bevel gears $B^{31}$, $B^{32}$, a shaft $B^{33}$ and individual belt-drives each of which includes a pulley $B^{34}$, a belt $B^{35}$, a variable-speed gear $B^{36}$, a belt $B^{37}$, a pulley $B^{38}$, a shaft $B^{39}$, and worm and worm-wheel gears $B^{40}$, $B^{41}$. The stripper $B^{11}$ is conveniently geared to the roller $B^9$ by spur-gearing $B^{42}$, $B^{43}$.

The delivery rate of the metering rollers $B^7$, $B^7$ may be regulated separately at each unit by suitable adjustment of the variable-speed device $B^{36}$.

The ingredient fibre received from the relative duct $A^5$ by each cage $B^3$ is condensed thereon and caused to be deposited within the trunk $B^2$, where a substantially constant head is maintained by a photo-electric detector cell $B^{44}$ which is sensitive to the instantaneous quantity of material in the trunk and which is connected by the line $B^{45}$ to suitable electronic apparatus $B^{46}$ serving to control a speed regulator (indicated conventionally at $B^{47}$) associated with the lattice $A^1$ of the primary opening stage A, the arrangement being such that the rate of output at stage A is adjusted in accordance with the rate at which the fibre in the trunk $B^2$ is being discharged by the metering rollers $B^7$. It will be understood that suitable light sources (not shown) are positioned in alignment with cells $B^{44}$ to illuminate the same when the passage of the light is not obstructed by material in the trunks containing these cells, at the level thereof, so that none of such cells will be energised so long as the column of material in its trunk stands at a level above such cell.

Each trunk $B^2$ also preferably contains a photo-electric detector cell $B^{52}$, all of the same being suitably connected by a line $B^{53}$ to the electronic control apparatus $B^{46}$, the cells $B^{52}$ being near the bottoms of the trunks $B^2$. It will be understood that suitable sources of illumination (not shown) are arranged to illuminate cells $B^{52}$ when the material in the trunks containing the same drops below the level of such cells. When, therefore, any trunk is nearly emptied of material, the level thereof having dropped below the cell $B^{52}$ in such trunk, the energisation of such cell will transmit a signal to the electronic control apparatus $B^{46}$. The latter has two functions. One is to control the speed regulator $B^{47}$, whereby the speed of the motor operating the feed lattice $A^1$ which feeds opened material to a particular feed trunk $B^2$ is increased whenever the photo-electric cell $B^{44}$, is illuminated, because of the fact that material in that trunk has dropped below the level of that cell, as noted above. The other function of control apparatus $B^{46}$ is to stop the entire blending apparatus whenever the level of material in any trunk falls below the level of the cell $B^{52}$ thereof, so that a signal is sent from that cell to the control apparatus $B^{46}$, as stated above. This function is accomplished by the apparatus shown diagrammatically at $B^{46}$ by a suitable conventional arrangement whereby the motors $B^{15}$ and $B^{16}$ of the blending apparatus and the motors for all the feed lattices $A^1$ are stopped or uncoupled whenever a signal as described is sent by a cell $B^{52}$ to the control device $B^{46}$.

As has already been explained, the ingredient of each trunk $B^2$ is discharged by the rollers $B^7$ (at a rate determined by the setting of the variable speed device $B^{36}$) so that it emerges in the form of a downwardly-depending sheet the fringe whereof is continuously combed by the tips of the spikes $B^{14}$ of the lattice $B^8$. The tufts of fibre which are impaled upon the lattice spikes $B^{14}$ at each successive pair of metering rollers $B^7$ compose a tenuous layer, so that when the spikes reach the stripping point at the conveyor roller $B^9$ the lattice is carrying as many superposed layers of different ingredients as there are delivery units in the blending apparatus.

The composite mass of layered tufts is removed from the lattice by the stripper $B^{11}$ and discharged into the duct $B^{12}$, whence the blended material in the particular apparatus illustrated is conducted to the opening machine C.

The opening machine C (Fig. 4) comprises a cage condenser $C^1$ and a gravity feed trunk $C^2$, which are respectively similar to the components $B^3$ and $B^2$ of the blending apparatus, and a photo-electric cell $C^3$ in said trunk $C^2$ which is connected by a line $B^{49}$ (Fig. 3) to electronic apparatus $B^{50}$ serving to control a clutch $B^{51}$ which is included in the shaft $B^{27}$ between the pulleys $B^{26}$ and $B^{28}$ in the drive of the metering rollers $B^7$, $B^7$ of the feed trunks $B^2$, the arrangement being such that in the event of the photo-cell $C^3$ being operated when the level of the material received in the trunk $C^2$ reaches the height thereof, delivery from the blending apparatus to the opener is arrested by the stoppage of the metering rollers $B^7$, $B^7$.

The adjustment of the variable-speed units $B^{36}$, by which it is possible to effect a variation in the gear-ratio between the pulleys $B^{34}$ and $B^{38}$ in the metering roller drives, enables the rate of delivery of each ingredient to the blending lattice $B^8$ to be determined as may be necessary to provide any desired proportional admixture in the blend of materials discharged into the trunk $B^{12}$. The several metered delivery units $B^2$ may be calibrated for use with specific kinds of fibre, so that irrespective of its density the required proportion of an ingredient in a given blend may be achieved merely by regulating the speed of the metering rollers $B^7$, $B^7$ of the trunk $B^2$ in question, by an adjustment of the relative unit $B^{36}$.

The output from the opener C is delivered by a spiked lattice $C^4$ having a stripper $C^5$ which discharges into a pneumatic duct $C^6$.

The final opening stage in the apparatus illustrated is performed by an intensive opening machine D (Fig. 5) which comprises a cage condenser $D^1$ which receives the blended fibres from the duct $C^6$ a gravity feed trunk $D^2$, a roller-and-pedal feed mechanism $D^3$, a beater $D^4$, a stripping cylinder $D^5$, a cage condenser $D^6$ and a pair of delivery rollers $D^7$. (The intensive opening machine D may be replaced by a conventional scutcher, the lattice of which is fed from the trunk $D^2$, conveniently by means of a single delivery roller, from which the material is delivered to the lap-forming rollers $E^1$, $E^2$).

From the stage D, the fleece issuing from the rollers $D^7$ is passed through the stack of calender rollers $E^1$ of the lap-forming machine (Fig. 1) to be converted into a compactly wound lap by the rollers $E^2$ upon which the lap rests and by which it is rotated.

If desired, and more particularly in the treatment of synthetic staple fibre which does not require the same degree of opening as natural fibres, the supplementary opening stage by the machine C may be omitted, in which case the pneumatic duct $B^{12}$ (Fig. 1) is arranged to delivery directly into the inlet of the final opening stage D.

Due to the fact that the blending operation is performed at an early stage in the process, and to the care which is taken to ensure that the several ingredients are individually opened before blending, it is possible by the process hereinbefore described to attain an unusually homogeneous dispersion of each ingredient throughout the mixture, so that their individual characteristics are substantially incapable of detection and a yarn or fabric possessing a very high degree of uniformity can be obtained.

The blending apparatus B may be modified in the manner illustrated diagrammatically in Fig. 6, for the purpose of enabling it to operate with different distributions of opened material in different cases when required or desired, as has been indicated above. In this figure, the gravity feed trunks of a four trunk blending apparatus, which may be similar in all respects to the trunks $B^2$, shown in Fig. 3, are indicated respectively at BA, BB, BC and BD, which are connected by ducts $A^5$, to the primary opening machines AA, AB, AC and AD respectively, the opening machines and connecting ducts being the same as those shown in Fig. 1. Said ducts $A^5$ are also interconnected by transfer ducts, of which the duct T, as shown, connects the first two ducts $A^5$, the duct $T^1$ connects the first and third, the duct $T^2$ connects the first and the fourth, while the duct $T^3$ connects the second and the third, the duct $T^4$ connects the second duct, $A^5$ with the fourth duct $A^5$ and the duct $T^5$ connects the third with the fourth duct $A^5$. The ducts $A^5$ are controlled by valves AV and each transfer duct is controlled by a valve TV.

The apparatus thus modified may be used to distribute opened material from any selected members of the opening devices, including all of them, to any selected members of the group of feed trunks, including all of them. For example, all of the valves AV being open and all of the valves TV being closed, each opener AA, AB, AC and AD delivers respectively to a separate trunk BA, BB, BC and BD of the blending apparatus, an arrangement which may be used for blending four different ingredients, opened separately, as already described.

For another example, by suitably setting the valves, AV and TV, a single opener may be connected to feed two or more delivery trunks and similarly two openers, for example, may be connected to feed more than two trunks. This may be useful, for instance, where a mill has installed a blending line embodying four openers and blending apparatus having four gravity feed trunks, and wishes to change from a four-ingredient to a two-ingredient blend. In such a case, it may be desirable to have two openers deliver to all four trunks, which should give a somewhat better blend than merely having two openers cooperating with two feed trunks. Accordingly, openers AA and AB being used to open the two ingredients respectively, the valves AV of the openers AA and AB will be open and the valves AV of the openers AC and AD closed, valves TV in ducts T and $T^2$ will be closed, leaving valve TV in duct $T^1$ open, so that opener AA will deliver to trunks BA and BC, and valves TV in ducts $T^3$ and $T^5$ will be closed leaving valve TV in duct $T^4$ open, so that opener AB will deliver to trunks BB and BD.

In another arrangement, by suitably setting the necessary valves, the delivery from any two openers can be fed to one trunk of the blending apparatus. Such an arrangement may be desirable where there is a fairly large proportion of one of the ingredient materials, particularly if this material is unusually difficult to open. In such a case, it might be advantageous to distribute this material between two or more openers, delivering to a single trunk. Thus, the material referred to could be supplied to two openers, AA and AB, both delivering to trunk BB, all valves AV being open, valve TV in duct T being open, and valves TV in ducts $T^1$, $T^2$, $T^3$, $T^4$ and $T^5$ being closed. In this case, valve AV in the duct $A^5$ leading from opener AA, being open, it is necessary to provide means for preventing material from opener AA being received by trunk BA, as well as by trunk BB. We have therefore indicated further valves VX, in the end portions of the four ducts $A^5$ adjacent to the trunks BA, BB, BC and BD. If, therefore, the valve VX, adjacent to trunk BA is closed, and the other three valves VX, left open, openers AA and AB will both deliver to trunk BB, while opener AC delivers to trunk BC, and opener AD to trunk BD. Similarly, the delivery from any two openers can be distributed between any three blending trunks.

Another case to be covered is one in which, on occasion, more ingredient materials are to be blended than the number of openers provided in the plant. For example, with an opening and blending apparatus built to provide for a blending of no more than four materials, it may be desired to change to a blend of five or more ingredients. In such a case, it may be advantageous to weigh out the correct proportions of, say, two of the ingredients, and to deposit them in layers, one on top of the other, on a feed lattice of the lattice opener, for example, on the feed lattice $A^1$ of the opener AA, Fig. 6. If then, each of the openers is connected to deliver only to its own particular blending trunk (opener AA to trunk BA, opener AB to trunk BB, etc.) the result will be that trunk BA, for example, contains two different ingredients, while each of the other trunks contains one ingredient only. This arrangement is indicated in the diagram Fig. 6, where one ingredient feed to opener AA is indicated at X and the other at Y.

Similarly, it may occasionally be desirable, for reasons of economy or otherwise, to add a very small proportion of some different material to one or more, for example, or to all of the main ingredients of the blend, which can readily be done by admixture of the added and main ingredients on the feed lattices. The general practice, however, is to reserve each individual opener for a separate ingredient.

The above illustrations are given by way of example only, and it will be understood that the numbers of openers and blending trunks may be modified to suit other particular requirements.

What we claim as our invention and desire to secure by Letters Patent is:

1. The method of producing blended textile fibrous materials which comprises a continuous sequence of steps of subjecting a plurality of different ingredient materials to separate opening operations, adjusting such operations so as to give all the opened materials substantially the same degree of openness, forwarding the opened materials simultaneously to a plurality of separate stations, there stacking each material in conditions of substantially controlled density and compacting it into the form of a loose sheet, feeding the material from said stations at speeds proportional to the proportions of the different materials desired in the blend, finely dividing the material of each sheet, and continuously superposing the finely divided materials from the different stations one upon another.

2. The method of producing blended textile fibrous materials which comprises subjecting a plurality of ingredient materials to separate opening operations, adjusting such operations so as to give all the opened material a substantially uniform degree of openness, forwarding the opened material to a plurality of separate stations, there stacking each material in conditions of substantially constant density and compacting the material into the form of loose sheets, feeding the same from said stations at speeds proportional to the proportions of the materials compacted at such stations desired in the blend, finely dividing the same, and superposing the finely divided materials from the different stations one upon another, and subjecting the resultant mass of superposed materials to a further opening operation.

3. The method of producing blended textile fibrous materials which comprises subjecting a plurality of ingredient materials to separate opening operations, forwarding the materials opened by such separate operations to different stations of a number determined by blending requirements under different conditions, there stacking each material in conditions of substantially constant density and compacting the material into the form of loose sheets, feeding the same from said stations at speeds proportional to the proportions of the materials compacted at such stations desired in the blend, finely dividing the same, and superposing the finely divided materials from the different stations one upon another.

4. The method of producing blended textile fibrous materials which comprises subjecting a plurality of ingredient materials to separate opening operations, forwarding the opened material to a plurality of separate stations, stacking each material in conditions of substantially constant density and feeding the same from said stations at speeds proportional to the proportions of the different ingredients desired in the blend, finely dividing the same, and superposing the finely divided materials from the different stations one upon another.

5. The method of producing blended textile fibrous materials which comprises a continuous sequence of steps separately opening a plurality of ingredient materials to substantially the same degree of openness, controlling the feeding of such ingredients during such opening to effect substantially the same degree of openness, continuously transferring the separately opened materials and progressing the separately opened materials forwardly at speeds proportional to the proportions of the ingredients desired in the blend, and continuously finely dividing and superposing all of the same, one upon another.

6. The method of producing blended textile fibrous materials which comprises subjecting a plurality of ingredient materials to separate opening operations, forwarding the opened material to a plurality of separate stations, stacking each material in conditions of substantially constant density and maintaining such materials at such stations under substantially constant density, feeding the same therefrom at speeds proportional to the proportions of the materials received at such stations desired in the blend, and finely dividing and collecting all of the same in a composite mass.

7. The method of producing blended textile fibrous materials composed of different ingredients which comprises a continuous sequence of steps subjecting different parts of such material having particular characteristics to separate opening operations, controlling the feeding of such ingredients during such operations to effect substantially the same degree of openness, continuously transferring the separately opened materials and progressing the separated opened materials forwardly at speeds approximately proportional to the proportions of the material thus separately opened desired in the blend, and finely dividing and collecting all of the same in a composite mass.

8. The method of producing blended textile fibrous materials composed of different ingredients which comprises subjecting different parts of such material having particular characteristics to separate opening operations, forwarding the opened material to a plurality of separate stations, stacking each material in conditions of substantially constant density and feeding the same from said stations at speeds approximately proportional to the proportions of the material thus separately opened desired in the blend, finely dividing the same, and collecting the same, one part superposed upon another, on a travelling conveyor.

9. The method of producing blended textile fibrous materials composed of different ingredients which comprises subjecting different parts of such material having particular characteristics to separate opening operations, forwarding the material thus separately opened to different stations of a number determined by blending requirements under different conditions, stacking each material in conditions of substantially constant density and finely dividing the material and collecting all of the same in a composite mass.

10. The method of producing blended textile fibrous materials composed of different ingredients which comprises subjecting different parts of such material having particular characteristics to separate opening operations, forwarding the material thus separately opening to a plurality of separate stations, there stacking each material in conditions of substantially constant density and compacting the material into the form of loose sheets, advancing such sheets from said stations, continuously finely dividing the material of the forward edges of such sheets emerging from said stations, and collecting the same upon a travelling conveyor.

11. The method of producing blended textile fibrous materials composed of different ingredients which comprises subjecting different parts of such material having particular characteristics to separate opening operations, forwarding the material thus separately opened to a plurality of separate stations, stacking each material in conditions of substantially constant density and advancing the material from said stations, continuously finely dividing the same and collecting all of it superposed on a travelling conveyor, stripping the material from the conveyor, and subjecting it to a further opening operation.

References Cited in the file of this patent

UNITED STATES PATENTS

| | | |
|---|---|---|
| 67,226 | Tainter | July 30, 1867 |
| 812,311 | Tyden | Feb. 13, 1906 |
| 1,359,029 | Butler | Nov. 16, 1920 |
| 1,545,367 | Tice | July 7, 1925 |
| 1,929,344 | Benoit | Oct. 3, 1933 |
| 2,057,641 | Curley et al. | Oct. 13, 1936 |
| 2,665,453 | Senior et al. | Jan. 12, 1954 |

FOREIGN PATENTS

| | | |
|---|---|---|
| 34,104 | Austria | Aug. 25, 1908 |